United States Patent [19]

Bolosky et al.

[11] Patent Number: 5,867,657
[45] Date of Patent: Feb. 2, 1999

[54] DISTRIBUTED SCHEDULING IN A MULTIPLE DATA SERVER SYSTEM

[75] Inventors: William J. Bolosky, Issaquah; Robert P. Fitzgerald, Redmond, both of Wash.

[73] Assignee: Microsoft Corporation, Redmond, Wash.

[21] Appl. No.: 684,840

[22] Filed: Jun. 6, 1996

[51] Int. Cl.[6] .................................................. G06F 13/14
[52] U.S. Cl. ..................................... 395/200.49; 395/826
[58] Field of Search ............................ 395/200.3, 200.47, 395/200.49, 553, 559, 672, 673, 826, 865

[56] References Cited

U.S. PATENT DOCUMENTS

| | | | |
|---|---|---|---|
| 5,195,092 | 3/1993 | Wilson | 340/825.5 |
| 5,398,336 | 3/1995 | Tantly | 395/200.31 |
| 5,428,781 | 6/1995 | Duault | 395/650 |
| 5,452,459 | 9/1995 | Drury et al. | 395/700 |
| 5,473,362 | 12/1995 | Fitzgerald et al. | 348/7 |
| 5,499,046 | 3/1996 | Schiller | 348/6 |
| 5,583,994 | 12/1996 | Rangan | 395/200.09 |
| 5,594,911 | 1/1997 | Cruz | 395/806 |
| 5,608,865 | 3/1995 | Midgely | 395/180 |

FOREIGN PATENT DOCUMENTS 96 04753 A of 1996 WIPO .

OTHER PUBLICATIONS

J. Hsieh et al., "Performance of a Mass Storage for Video on Demand",*Journal of Parallel and Distributed Computing*, vol. 3, No. 2, Nov. 1995, Orlando FL.

*Primary Examiner*—Eric Coleman
*Attorney, Agent, or Firm*—Lee & Hayes, PLLC

[57] ABSTRACT

The scheduling functionality for a distributed system having multiple data servers is spread across the data servers rather than being centralized at a single machine. The distribution of the scheduling across multiple servers enhances the scalability of the system and enhances the fault tolerance of the system. Viewer state records are employed that contain scheduling information for viewers. Scheduling occurs by circulating the viewer state records amongst the data servers that are to provide the requisite data. The data servers output data blocks in a predetermined sequence based on how the data blocks are striped across the data servers. Each viewer state record is forwarded to a first successor and second successors in the scheduling sequence. The task of adding a viewer to a schedule is also distributed to the data servers.

36 Claims, 17 Drawing Sheets

DISTRIBUTED SCHEDULING IN A MULTIPLE DATA SERVER SYSTEM

TECHNICAL FIELD

The present invention relates generally to data processing systems and more particularly to scheduling in a data processing system that has distributed scheduling.

BACKGROUND OF THE INVENTION

U.S. Pat. No. 5,473,362 describes a video-on-demand system that has a number of data servers with storage devices at which are stored data sequences, such as data sequences for movies. The data servers are under control of the controller, and each data server may have one or more storage devices, such as disk storage devices, attached to it. The data servers are designated as "cubs" and the controller is designated as a "tiger." Each cub has one or more high bandwidth network connections to a switched network, such as an ATM network or a switched Ethernet.

Each movie or data file is striped across the storage devices that are connected to the cubs. Each file is divided into blocks of a certain duration and each block is written on a storage device associated with a successive cub in a predefined sequence. Thus, for example, a first block of the data file may be stored on a storage device of a first cub, a second sequential block may be stored on a storage device of a second cub and a third sequential block may be stored on a storage device of a third cub. As a result of this storage scheme, when a viewer wishes to see the data file, each successive cub must output the data block stored on its storage device in sequence at the proper time.

In order to prevent two viewers from needing access to a same storage device at exactly the same time, the tiger controller maintains a centralized schedule of viewers. The schedule is divided into slots, where each of the slots represents a unit of system capacity to send a block of the data file to a viewer during a given time interval. Scheduling occurs on a per slot basis. When a viewer requests to view a movie, the viewer has to wait until the storage device holding the first block of the movie encounters an empty slot in the schedule. The slot may then be assigned to the viewer. FIG. 1 depicts an example of the scheduling of slots for three disk storage devices. Each disk has a like sequence of slots time-shifted relative to its predecessor. At time 0, disk 0 outputs the first data block for slot 1 that is assigned to a viewer. One time unit later, disk 1 outputs the next successive block for that slot, and at time 2, disk 2 outputs a next successive block in slot 1. As can be seen in FIG. 1, each disk storage device has a column with time slots at which it sequentially outputs blocks of data.

One limitation of the above-described system is that scheduling may fail if the tiger controller fails. The tiger controller constitutes a single point of failure within the system. In addition, a great deal of network traffic must flow between the tiger controller and the cubs in order to properly perform scheduling.

SUMMARY OF THE INVENTION

In accordance with a first aspect of the present invention, an object that encapsulates scheduling information for reading of data blocks of a data sequence is forwarded to each data server that stores a data block of data sequence in a distributed system. In response to receiving the object, each data server schedules reading of a selected one of the data blocks that it stores. The selected data block is identified by scheduling information in the object.

In accordance with another aspect of the present invention, a computer-readable storage medium holds an object that encapsulates scheduling information for outputting blocks of a data sequence. The object is constructed to be forwarded among data servers to schedule the outputting of the blocks of the data sequence. The object includes an indication of which selected block of the data sequence is to be output and an indication of what file contains a selected block. The object further includes an indication of where the selected block is to be output and indication of when the selected block is to output.

In accordance with a further aspect of the present invention, a first of the data servers receives a viewer state record that encapsulates scheduling information for a read operation of a selected data block of a data sequence. In response, the read operation is scheduled by the first of the data servers. The viewer state record is forwarded from the first data server to a second of the data servers that is responsible for reading a next data block of the data sequence after the selected data block. The viewer state record is also forwarded to a third of the data servers that is responsible for reading a data block after the next data block in the data sequence. The viewer state records are forwarded to the second and third data servers to facilitate scheduling.

In accordance with yet another aspect of the present invention, a scheduling data structure is received at a selected one of a plurality of video data servers that store sequences of video data. A scheduling data structure holds information about an operation on a file to be scheduled by the selected video data server. In response to receiving the scheduling data structure, the operation on the file is scheduled at the selected video data server. The scheduling data structure is updated and forwarded to a next of the video data servers that has performed an operation on the file.

In accordance with an additional aspect of the present invention, a method is practiced in a computer system that has data servers with storage devices across which data blocks of data sequences are striped. The data servers are organized into a defined sequence. Time is divided into a repeating cycle of time slices for each data server. A time slice is a sufficient amount of time to output a data block by one of the data servers. Each data server has a like cycle of time slices such that each time slice has a position in the cycle and each cycle is offset in time relative to the cycle of its predecessor data server in the sequence of data servers. Aggregates of like position time slices and cycles of the data servers are designated as slots. For a given slot, a time is designated at which a selected one of the data servers owns the given slot such that only the selected data server is permitted to output a data block to a specified viewer at the time. At the designated time at which the selected data server owns the given slot, the outputting of an identified data sequence is scheduled by assigning the specified viewer to the given slot such that during the time slices that make up the given slot, data blocks of the identified data sequence are output from the data servers to the specified viewer.

DETAILED DESCRIPTION OF THE INVENTION

The preferred embodiment of the present invention distributes scheduling of the outputting of data blocks from data servers to clients rather than placing the burden on a central controller. The distribution of the scheduling responsibility across multiple servers enhances the scalability of the system and enhances the fault tolerance of the system. The scalability of the system is enhanced because a single entity with limited scheduling capacity is not responsible for all of the scheduling; rather, scheduling is distributed to multiple servers where each server has a smaller responsibility than the controller and larger scheduling burdens are accompanied by the addition of servers for handling the scheduling burden. The fault tolerance is enhanced in the preferred embodiment because there is not a single lethal point of failure. Multiple servers must fail in order to totally disable scheduling in the system. Moreover, the scheduling is performed in a way that accounts for possible server failure as will be described in more detail below.

The preferred embodiment employs viewer state records that encapsulate scheduling information. The viewer state records are forwarded among the data servers of the system before operations are performed to provide the data servers with the requisite information that they need to schedule the operations. No centralized authoritative copy of the schedule is maintained. As will be described in more detail below, the data servers output data blocks in a predetermined sequence based upon how data blocks are striped across the data servers. When a data server receives a viewer state record, the data server records information out of the viewer state record and schedules the operation identified by the viewer state record. The viewer state records are forwarded to both a first successor and a second successor in the predefined data sequence to help compensate for possible data server failure. Thus, it is ensured that the only copy of the viewer state record is not resident on a single failed data server. The preferred embodiment distributes the task of adding new viewers to the schedule among the data servers. A data server may only output a data block in a schedule slot when it owns the slot. The preferred embodiment provides a protocol for assigning a previously empty slot to a viewer so that the viewer may receive data.

Figure 1:
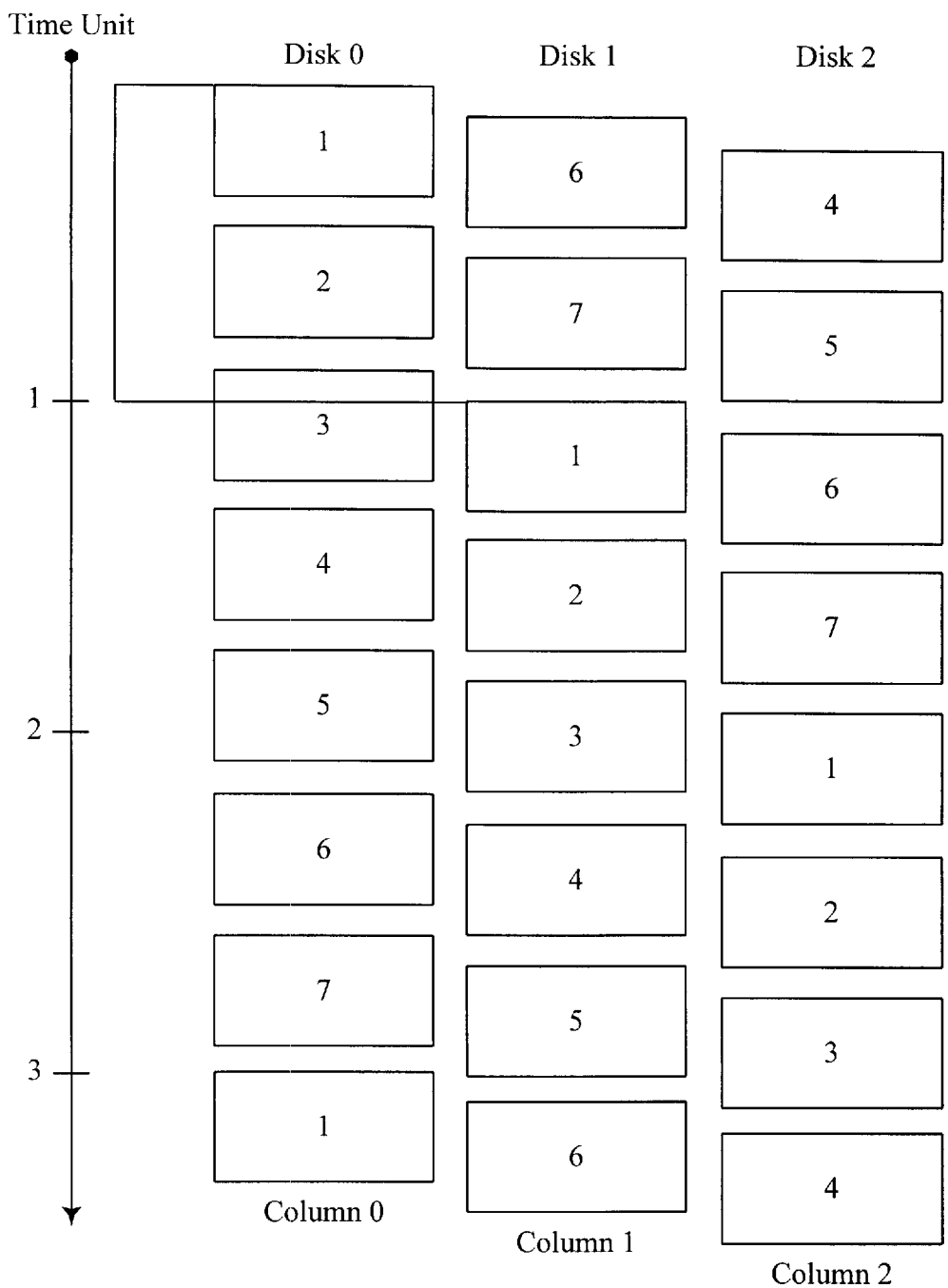
FIG. 1 is a diagram that illustrates the scheduling of input/output operations in a conventional video-on-demand system.
Figure 2:
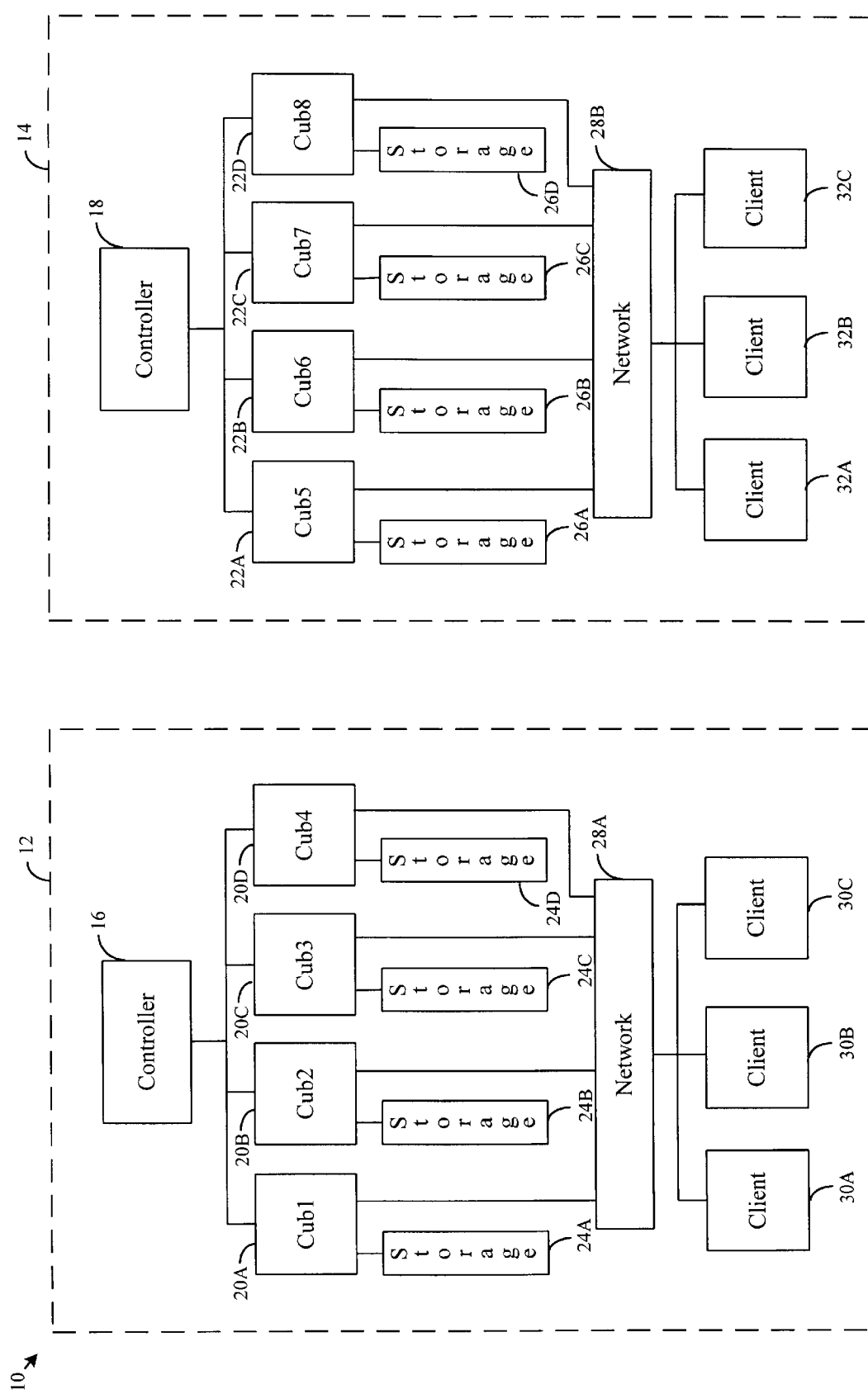
FIG. 2 is a block diagram of a system that is suitable for practicing the preferred embodiment of the present invention.

FIG. 2 is a block diagram of a system 10 that is suitable for practicing the preferred embodiment of the present invention. The system 10 includes two tiger subsystems 12 and 14. Those skilled in the art will appreciate that the present invention may be practiced with additional tiger subsystems or with only a single tiger subsystem, depending on the needs of the viewers. In general, the number of subsystems is scalable. Each tiger subsystem 12 and 14 includes a tiger controller 16 and 18 for controlling operation of the data servers 20A, 20B, 20C, 20D and 22A, 22B, 22C, 22D, respectively. These data servers may be conventional file servers or other types of computer systems. For purpose of the discussion below, these data servers will be referred to hereinafter as "cubs." The depiction of four cubs per controller is merely for illustrative purposes. The present invention is not limited to the use of four cubs per controller. Each cub 20A, 20B, 20C, 20D, 22A, 22B, 22C, and 22D has an associated storage 24A, 24B, 24C, 24D, 26A, 26B, 26C, and 26D. The storage may include one or more storage devices and may include storage devices of different types, including magnetic disk drives, optical disk drives or other types of storage devices. The storages 24A, 24B, 24C, 24D and 26A, 26B, 26C, 26D hold data that is to be transmitted over respective networks 28A and 28B to clients (such as viewers) 30A, 30B, 30C, and 32A, 32B, 32C. The data may be any of a number of different types, including audiovisual sequences, multimedia data, or even software. For illustrative purposes in the discussion below, the data is assumed to be multimedia data in the form of audiovisual sequences.

In order to provide parallelism and load balancing among clients, the preferred embodiment of the present invention stores its data across sequential ones of the storages 24A, 24B, 24C, 24D, and 26A, 26B, 26C, and 26D. Data is striped across the storage devices for a group of cubs that share a common controller such that successive sequential blocks of each audiovisual data sequence are stored on successive storage devices in a predefined sequence. Hence, the first block of a data sequence may be stored on storage 24A under the control of cub 20A. The next block may be stored on storage 24B under the control of cub 20B and a third sequential block may be stored on storage 24C under the control of cub 20C. A fourth sequential block may be stored on storage 24D under the controller cub 20D and a fifth block may be stored on storage 24A under the control of cub 20A. Successive blocks are striped in a like fashion. In the preferred embodiment of the present invention, the blocks are of a fixed size in order to simplify management of the system 10. Nevertheless, the present invention may also be practiced with variable-sized blocks. Each data sequence may have a different striping sequence.

The cubs 20A, 20B, 20C, 20D and 22A, 22B, 22C and 22D output their data blocks over networks 28A and 28B, respectively. The networks 28A and 28B may be part of a single larger network and may use different switching mechanisms. One suitable form for the networks 28A and 28B is an asynchronous transfer mode (ATM) network that employs ATM switches. Alternatively, the networks 28A and 28B may be Ethernet networks. The data blocks from the cubs 20A, 20B, 20C, 20D, and 22A, 22B, 22C, and 22D are combined by the switches in the respective networks 28A and 28B to produce a single continuous output data stream that is passed to a single client (i.e., a "viewer") 30A–30C and 32A–32C. Multiple output data streams may be concurrently output to different clients. The switches in the networks 28A and 28B create a multipoint to point data funnel that delivers data to a single point (i.e., a single client).

Figure 3:
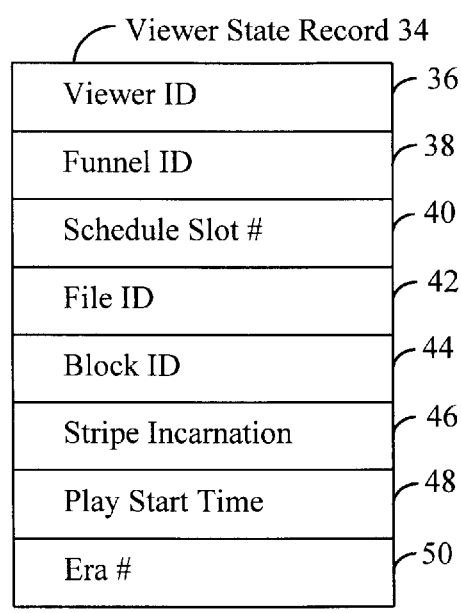
FIG. 3 illustrates the format of a viewer state record in the preferred embodiment of the present invention.

As mentioned above, the preferred embodiment of the present invention achieves scheduling largely by passing viewer state records around the rings of cubs 20A–20D and 22A–22D, respectively. Each viewer state record describes the information that is necessary to schedule an operation for a particular client at a particular time as well as the information that is necessary to have future operations scheduled on behalf of that client. FIG. 3 illustrates the format of a viewer state record 34. Each viewer state record includes a number of fields like those shown in FIG. 3. The fields need not be ordered in the sequence shown in FIG. 3; rather, the order depicted in FIG. 3 is intended to merely illustrative. Field 36 of the viewer state record 34 contains a ViewerID that identifies the viewer to which the read data is to be delivered. Field 38 holds a FunnelID that identifies the data funnel that is used to deliver the data to the destination client. Field 40 holds a value that specifies a slot number. The schedule may be viewed as being composed of a number of slots, and the slot number identifies the slot in the schedule that is assigned to the destination viewer. Field 42 holds a FileID that identifies the file holding the data blocks that are to be output to the destination viewer, and field 44 holds a BlockID that identifies the next data block to be read and output by the cub that receives the viewer state record. Field 46 holds a stripe incarnation value that is used to identify an incarnation of a stripe, and field 48 holds a play start time that identifies when the play sequence of the file for the destination viewer began. Lastly, field 50 holds an era number that identifies how long it takes to output data for the entire ring of cubs that form the predefined sequence of cubs that hold blocks of data for the data file.

Figure 4:
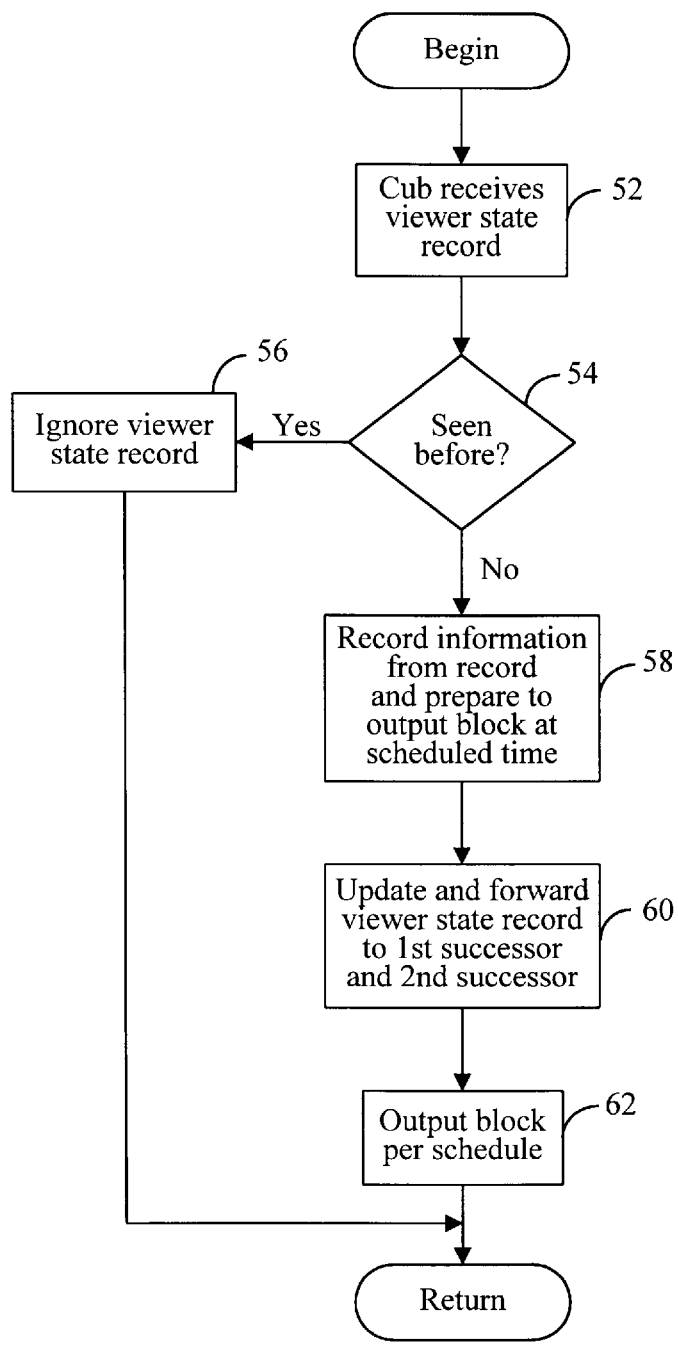
FIG. 4 is a flowchart that illustrates the steps that are performed when a cub receives a viewer state record.
Figure 5:
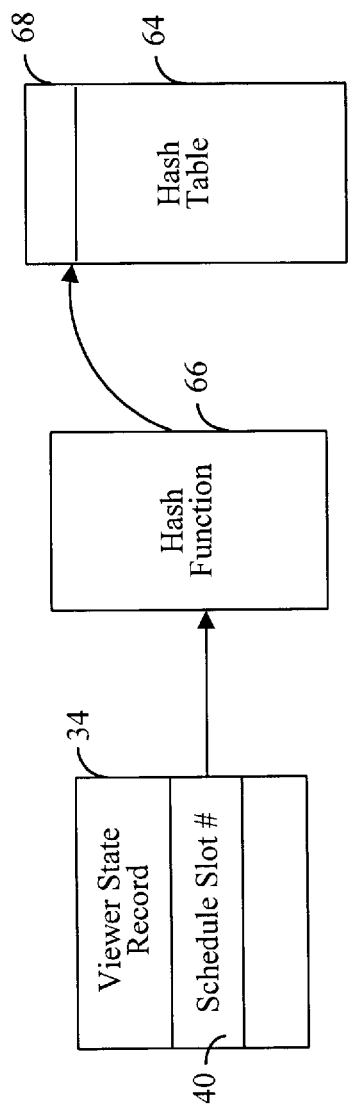
FIG. 5 is a block diagram illustrating how a hash function and a hash table are used in processing viewer state records.

FIG. 4 is a flowchart illustrating the steps that are performed when a cub receives a viewer state record. Initially, the cub receives a viewer state record (step 52 in FIG. 4). As will be described in more detail below, cubs will typically receive more than one viewer state record for a same-read operation. Hence, the cubs ignore viewer state records that are received after a first one has already been received. Thus, in step 54, the cub checks whether it has seen previously a viewer state record for the associated operation. Each cub maintains a record of which viewer state records it has received. Specifically, as shown in FIG. 5, each cub maintains a hash table 64 that holds information, including viewer state records that it has received but not yet forwarded. When a new viewer state record 34 is received, the value in field 40 that specifies a schedule slot number is input to a hash function 66 that generates a hash value to index an entry 68 in the hash table 64. If another view state record for the same schedule slot number and BlockID has been received, a record of the previous viewer state record will be stored in entry 68 in the hash table 64. The hash table 64 is an open hash table wherein each entry in the table holds a list of zero or more viewer states. Thus, in performing step 54 in FIG. 4, the cub consults the hash table 64.

Figure 6:
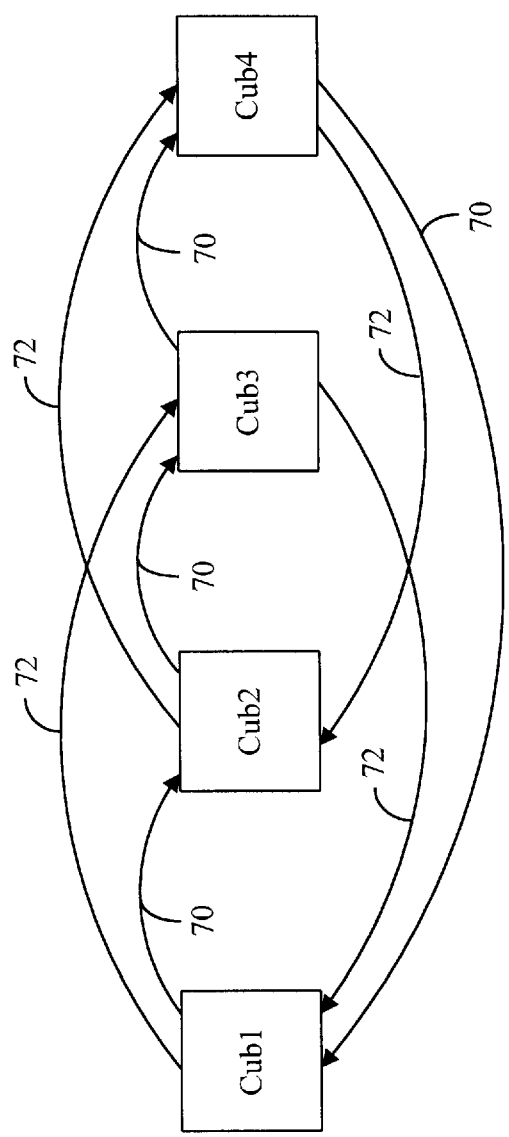
FIG. 6 is a block diagram illustrating how viewer state records are forwarded to first and second successors.

If a viewer state record for the same read operation has already been received, as checked in step 54 of FIG. 4, the more recently received viewer state record is ignored (step 56 in FIG. 4). On the other hand, if a viewer state record for the read operation has not yet been received and examined by the cub, the cub records information from the record in the hash table 64 and prepares to output the associated data block at the scheduled time (step 58 in FIG. 4). The viewer state record is updated by updating the BlockID to identify the next block to be output and updating the era number when the viewer state record is being forwarded from the last cub in a sequence to the first cub in the sequence and forwarded to a first successor cub and a second successor cub provided that end of the file has not been reached (step 60 in FIG. 4). When the end of the file has been reached, the propagating of the viewer state records ceases. The forwarding of the viewer state records to the first successor and second successor enhances the fault tolerance of the system. In this way at least two cubs know about each client that is receiving data at any time. This information may be useful to account for cub failure and take the appropriate steps after the cub has failed. FIG. 6 shows an example of how the viewer state records are forwarded to a first successor and a second successor. FIG. 6 shows an instance where cub 1 outputs a data block, followed by cub 2, which is followed by cub 3 and which, lastly, is followed by cub 4. The arrows 70 identify the forwarding of the viewer state records to the first successor. Thus, cub 1 forwards a copy of the viewer state record to cub 2, and cub 2 forwards a copy of the viewer state record to cub 3 and so forth. The arrows 72 identify the forwarding of the viewer state records to the second successor. Thus, cub 1 outputs a copy of the viewer state record to cub 3 and cub 2 outputs a copy of the viewer state record to cub 4, etc.

Sometime after the viewer state record has been received and processed by the cub, the associated data block is output according to the schedule (step 62 in FIG. 4).

Figure 7:
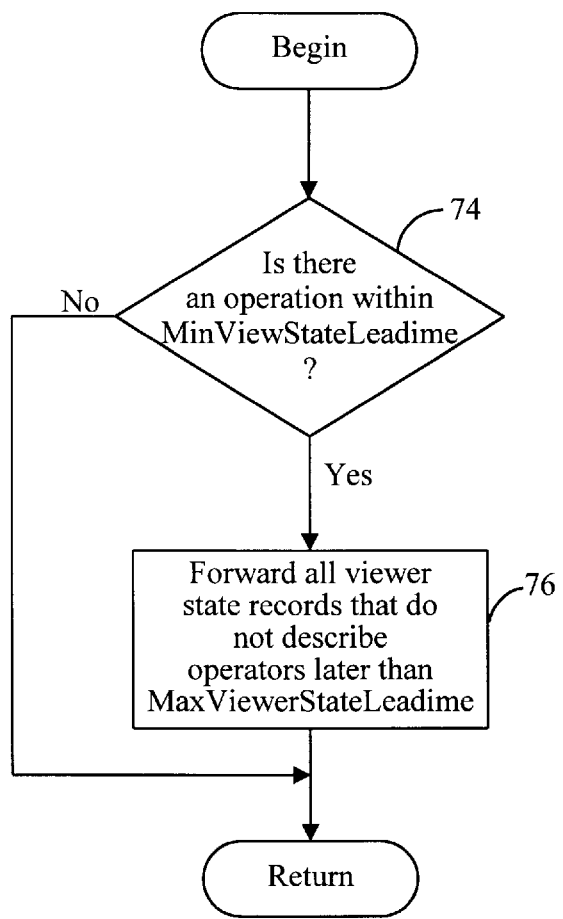
FIG. 7 is a flowchart illustrating the steps that are performed to determine what viewer state records should be batched together and forwarded.

The above discussion provided a simplified explanation of the forwarding of the viewer state records among cubs. Forwarding each viewer state record independently proves to be somewhat cumbersome and proves to dramatically increase the amount of traffic between the cubs. As a result, the preferred embodiment of the present invention aggregates viewer state records and sends them in groups or bunches to decrease the computational overhead required to perform a number of sends and decrease the traffic between cubs. FIG. 7 is a flowchart illustrating the steps that are performed to determine whether a given viewer state record should be included in a bunch of viewer state records that are to be forwarded. Before elaborating on the steps shown in the flowchart of FIG. 7, it is helpful first to understand some global parameters that are maintained by the system 10. The system maintains a global parameter minViewerStateLeadTime, that specifies a minimum lead time for a viewer state record. The system also maintains a global parameter maxViewerStateLeadTime, that specifies the maximum viewer state lead time. Suitable values for these parameters are 4 seconds for minViewerStateLeadTime and 9 seconds for maxViewerStateLeadTime. Viewer state records are intended to precede the operations they describe by an amount of time somewhere between the values of minViewerStateLeadTime and maxViewerStateLeadTime. The system also maintains a value for a variable maxViewerStateLagTime that specifies the maximum lag time at which a viewer state record is permitted to arrive after the operation it describes has or should have occurred. A suitable value for maxViewerStateLagTime is 150 milliseconds.

Figure 8:
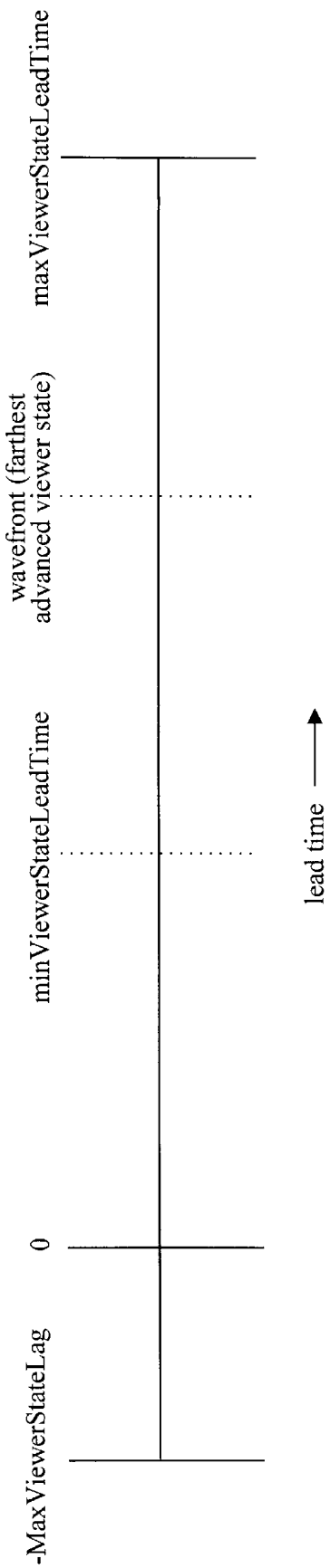
FIG. 8 is a diagram illustrating a timeline of times involved in operation of the preferred embodiment of the present invention.

FIG. 8 is a diagram that helps to illustrate how these variables are utilized. The X-axis of this diagram designates lead time where the lead time is the time at which the data block that is described by a viewer state record would be handed to the network 28A or 28B minus the current time. Preferably, the viewer state record is forwarded some time between minViewerStateLeadTime and maxViewerStateLeadTime. The wavefront that is labeled in FIG. 8 designates the farthest advanced viewer state record for a given play sequence. Given this background, the discussion below focuses on the forwarding of viewer state records in batches.

In step 74 of FIG. 7, the cub determines whether there is a viewer state record that is to be forwarded to a successor (i.e., a first successor or a second successor) that describes an operation that is within the value of minViewerStateLeadTime. The cub then forwards all of the viewer states destined for the given successor that do not describe operations later than the value of maxViewerStateLeadTime from the current time (step 76 in FIG. 7).

Figure 9:
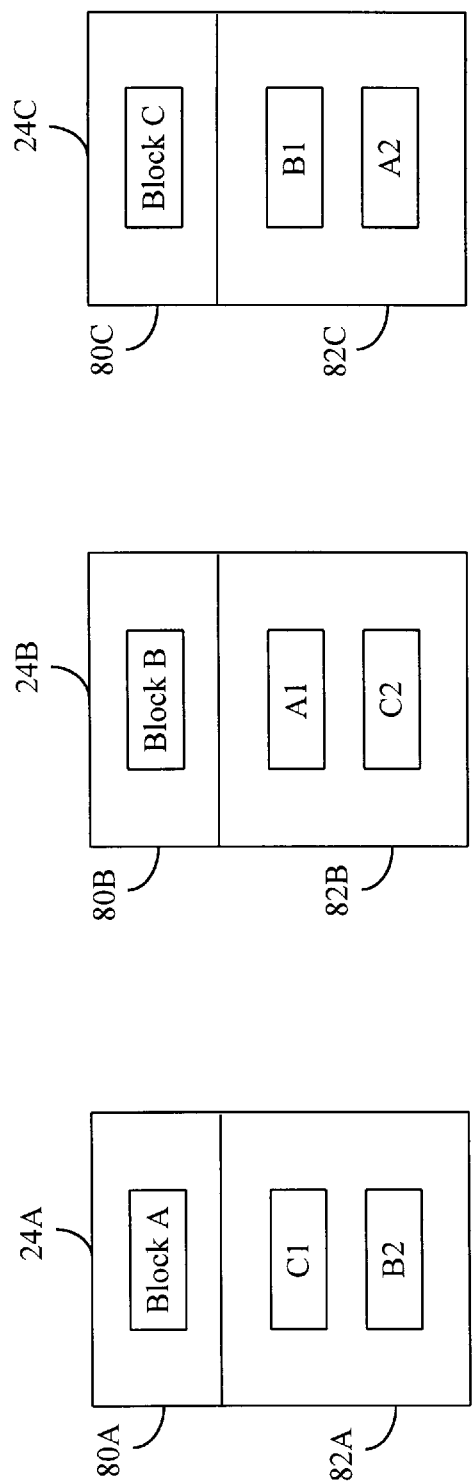
FIG. 9 is a block diagram illustrating an example of how mirroring is used by the preferred embodiment of the present invention.

Component failure, such as the failure of a storage device or cub is addressed by the preferred embodiment of the present invention. In particular, the preferred embodiment of the present invention uses mirroring such that for each primary data block, secondary subblocks are mirrored and stored on storage devices that are associated with successive cubs within the system. FIG. 9 depicts an example that illustrates how the primary blocks and secondary subblocks are stored. In the example shown in FIG. 9, each of the storage devices 24A, 24B and 24C is divisible into a primary section 80A, 80B, 80C in which data blocks are stored and a secondary section 82A, 82B and 82C in which mirrored subblocks are stored. Block A is stored in the primary storage area 80A of storage 24A. In contrast, the subblocks A1 and A2, that in aggregate constitute the block A, are stored on storages 24B and 24C, respectively. Storage 24B is under the control of cub 20B and storage 24C is under the control of cub 20C. Thus, the subblocks are distributed to the next successive cubs in the predefined sequence of cubs that are used to output the data sequence. Blocks B and C have corresponding subblocks that are stored in a like dispersed fashion, as could be seen in FIG. 9.

When a storage component or cub fails, the secondary subblocks may be read and output to provide the data that the failed cub or storage would typically provide. The system may find out about failures by executing a deadman protocol. Each second, each cub sends a message to the next cub informing the next cub that it is alive. If the next cub does not receive such a message, the next cub informs the tiger. The tiger investigates and broadcasts a message telling of the failure if the cub has failed.

Figure 10:
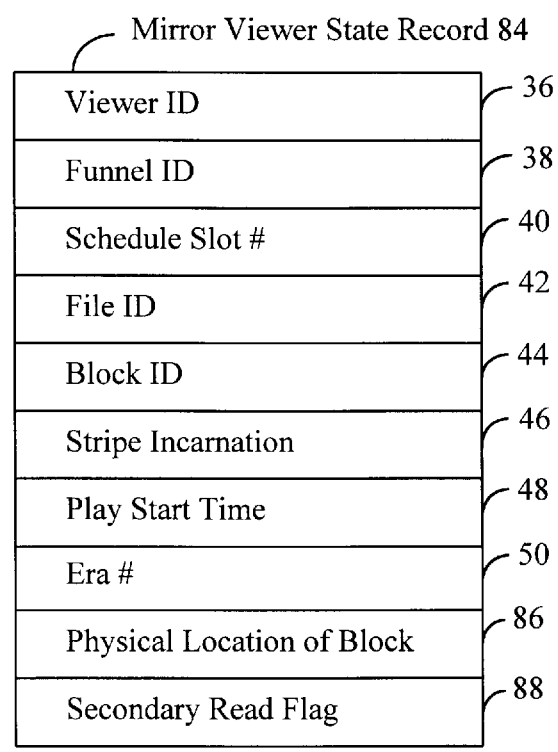
FIG. 10 is a diagram illustrating the format of a mirror viewer state record.

One complication is that the viewer state records correspond with read operations for data blocks rather than subblocks. Thus, when mirroring is employed, the preferred embodiment of the present invention utilizes mirror viewer state records. Mirror viewer state records are generated by the cub that follows the failed cub after the failed cub has either suffered a failed disk or a fatal system failure. As mentioned above, the tiger broadcasts the failure message to all of the cubs. When the cub that follows the failed cub receives a viewer state record and the failed cub was unable to perform the read of the primary block, the cub following the failed cub generates a mirror viewer state record. Each mirror viewer state record 84 (FIG. 10) holds fields 36–50 like that found in the conventional viewer state records 34 (FIG. 3). The mirror viewer state record gets forwarded to the other cubs that hold secondary blocks that make up a primary block so that the output of the secondary blocks is scheduled.

In addition, each viewer state record 84 also holds a field 86 that specifies the physical location on the failed disk of the primary data block. This information can be used to locate the corresponding secondary blocks. The physical location of the block is stored to reduce the amount of data that the cubs need to maintain about where file blocks are located in physical storage. For any disk on the storage, n primary blocks are stored along with n*d secondary blocks, where d is the decluster factor. The cubs store only mapping information for the n primary blocks and the n secondary blocks that are subblocks of blocks that reside on the immediate predecessor cub, rather than storing mappings from data blocks to each of the n*(d+1) blocks that are stored on the disk. As a result, the cub need only store 2*n mapping records. However, the cub does not know the mappings to subblocks that are on disks other than the disks of the immediate predecessor cub. Hence, when the mirror viewer state record is generated by the cub that succeeds the failed cub, the mirror viewer state record includes the physical location of the block on the failed disk. Subsequent cubs can compute the physical location of the subblocks from the information in the mirror viewer state record.

In addition, the mirror viewer state record 84 holds a field 88 that serves as a secondary read flag to specify that the viewer state record describes a secondary read of a subblock. This flag is used to distinguish viewer state records for primary blocks from mirror viewer state records for secondary blocks.

The mirror viewer state records are forwarded from cub to cub in a fashion like the normal viewer state records 34. The mirror view state records only go nDcluster hops beyond the failed disk that holds the primary data block and then expire. The value nDecluster specifies the number of subblocks that in aggregate constitute a block. In the example shown in FIG. 9, nDecluster has a value of 2. The mirror viewer state records only need to propagate nDecluster hops beyond the failed disk. Such a number of hops assures that all of the cubs that hold the subblocks are informed of the secondary read operation.

Figure 11A:
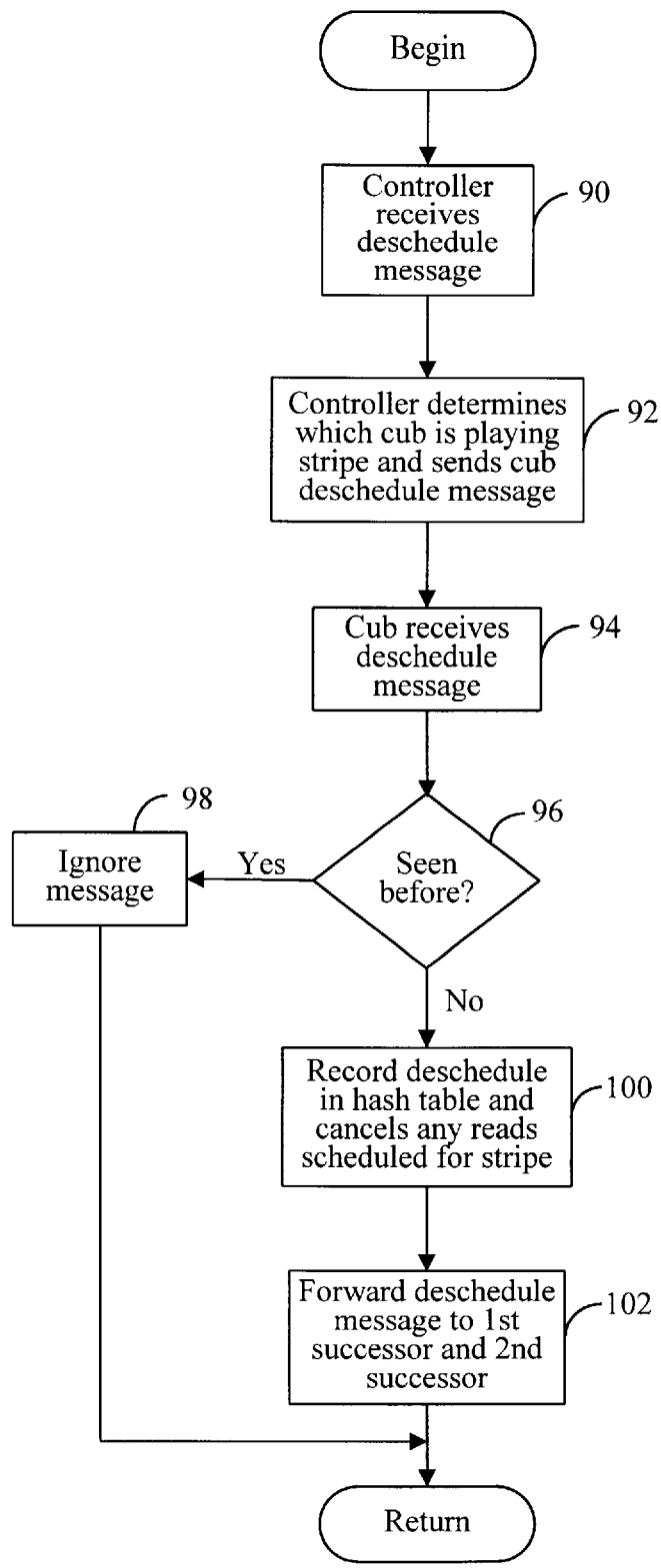
FIG. 11A is a flowchart illustrating the steps that are performed in a first alternative for descheduling a play sequence.

The preferred embodiment of the present invention may handle descheduling of play operations in two alternative fashions. The difference in the alternatives relates to how the system knows to stop forwarding deschedule messages. FIG. 11A depicts the first alternative wherein the deschedule message is forwarded to all the cubs in a sequence. The tiger controller 16 or 18 is informed of the deschedule in response to a client request to stop playing the movie. As a result, a tiger controller receives a deschedule message (step 90 in FIG. 11A). The tiger controller determines which cub is playing the stripe that has been requested for descheduling and sends the appropriate cub deschedule message (step 92 in FIG. 11A). The cub receives the deschedule message (step 94 in FIG. 11A) and checks whether it has seen the descheduled message before or not (step 96 in FIG. 11A). The cub maintains a list of deschedules in the viewer state hash table 64. If the cub has already seen the deschedule message, it ignores the message (step 98 in FIG. 11A). In contrast, if the cub has not previously seen the descheduled message, it records the descheduled message in the hash table 64 and cancels any reads that are scheduled for the corresponding stripe (step 100 in FIG. 11A). The cub then forwards a deschedule message to its first successor and second successor so that they may be informed of the descheduled operation as well, since they may have already been forwarded the viewer state record for an operation on that stripe (step 102 in FIG. 11A).

Figure 11B:
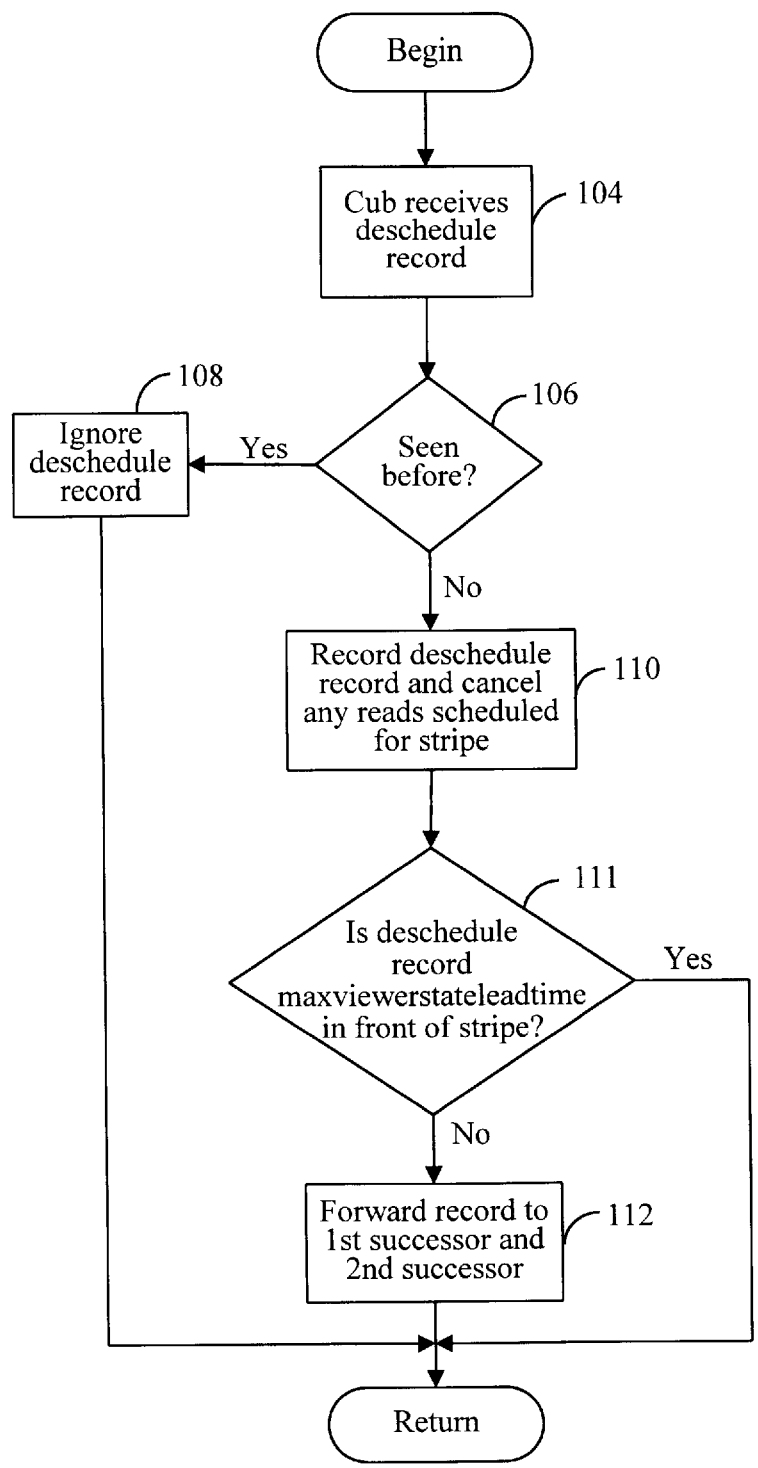
FIG. 11B is a flowchart illustrating the steps that are performed in a second alternative for descheduling a play sequence.

FIG. 11B is a flowchart that illustrates the steps performed in an alternative approach to descheduling that may be performed by the present invention. In this alternative, the deschedule message is only forwarded until it is maxViewerStateLeadTime in front of the sending of the blocks. This implementation is useful in very large systems because the deschedule record may be forwarded to less than allotted the cubs in a given sequence. In this alternative implementation, deschedule records propagate like viewer state records. In particular, a cub receives a deschedule record (step 104 in FIG. 11B). If the cub has previously seen the deschedule record (see step 106 in FIG. 11B), the cub ignores the deschedule record (step 108 in FIG. 11B). In contrast, if the cub has not previously seen the deschedule record it records the deschedule record and cancels any reads scheduled for the stripe associated with the deschedule record (step 110 in FIG. 11B). If the deschedule record is not maxViewerStateLeadTime ahead of the stripe (see step 111 in FIG. 11B), the deschedule record then is forwarded to the first successor and second successor (step 112 in FIG. 11B). The descheduled records only need to be propagated beyond the value of maxViewerStateLeadTime in front of the stripe that they are descheduling and thus are not propagated beyond this point (see step 111 in FIG. 11B). The speed at which the deschedule records are propagated may vary.

Figure 12:
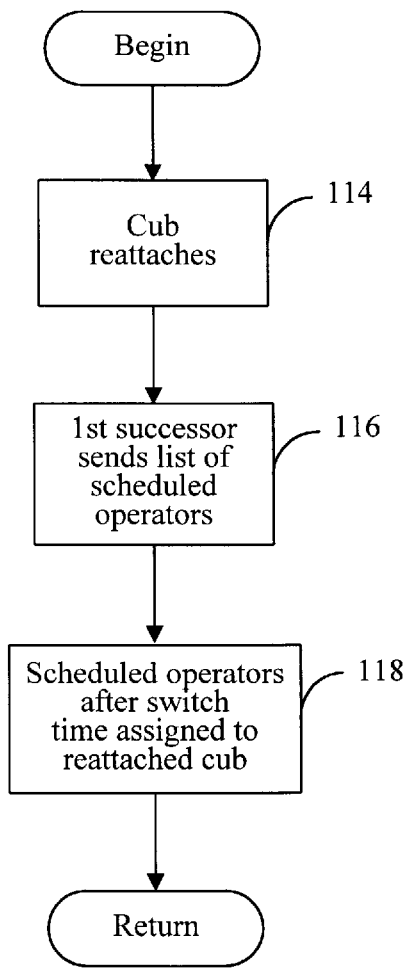
FIG. 12 is a flowchart illustrating the steps that are performed when a previously failed cub reattaches to the system.

The preferred embodiment of the present invention allows a failed cub to reattach itself and continue operation. FIG. 12 is a flowchart illustrating the steps that are performed in such an instance. If the cub has crashed, it eventually reattaches itself to the running system (step 114 in FIG. 12). The tiger will inform all of the cubs of the reattachment of the cub. When the cub reattaches it takes steps to take up the duties from the mirroring cubs. The first successor of the failed cub that has reattached sends a list of scheduled operations to the reattached cub (step 116 in FIG. 12). As was discussed above, the viewer state records have been propagated to the first successor, and thus, the first successor is aware of the outstanding scheduled operations. The scheduled operations are then performed such that any new operation that would take place after the reattached cub is to assume its old duties are performed by the reattached cub whereas those before the switchover time that have been scheduled by the mirror cubs are performed by the mirrored cubs (see step 188 in FIG. 12). The switchover time is negotiated between the reattached cub and its immediate successor.

Figure 13:
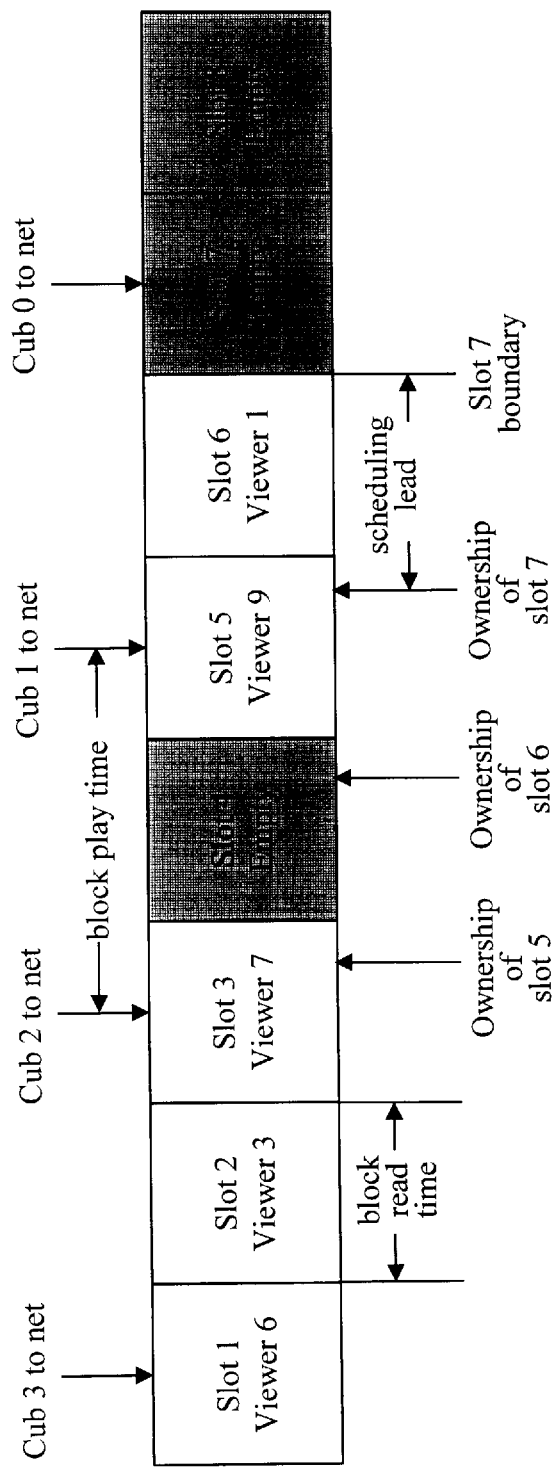
FIG. 13 illustrates an example of logical scheduling and assignment of slots by the preferred embodiment of the present invention.

The preferred embodiment allows a cub to assign a client to a slot in response to requests by that client to receive data. The preferred embodiment of the present invention assigns ownership of slots to cubs such that any slot is owned by at most one cub at a time and a cub many only schedule a client into a stripe when the cub owns the stripe. FIG. 13 shows an example of how this assignment of clients to stripes operates. Each box has an associated slot label and an indication if a viewer is assigned to the slot (e.g., "slot 5 viewer 9"). The top of FIG. 13 includes arrows that specify the mapping cubs to slots at a current time. For example, the arrow "cub 2 to net" indicates the time at which cub 2 outputs a data block to the network. As time advances, the cubs move along the schedule to the right to the next successive slots, assuming that all the slots are occupied. The arrows on the bottom of the diagram illustrate the points at which ownership of the various slots occurs. FIG. 13 also indicates the lengths of the block read time and the scheduling lead time.

In order to understand the notion of ownership, it is helpful to consider an example. Consider slot 7 which is an empty slot. Cub 1 will be the next owner of slot 7. Cub 1 will own slot 7 when enough time is advanced for cub 1 to be directly over the ownership arrow indicated in FIG. 13. At that time, if cub 1 has a viewer waiting to be scheduled, the cub will insert the viewer into slot 7 and inform cubs 2 and 3 of this ownership. Cub 2 will then know to not fill slot 7 because slot 7 is already owned.

Figure 14:
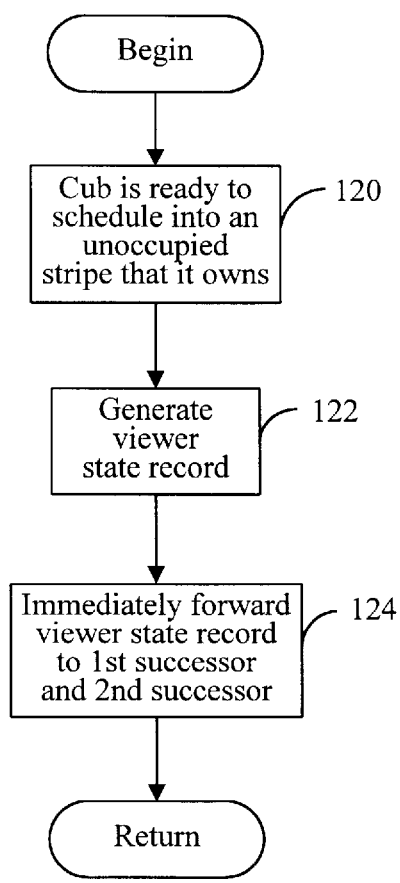
FIG. 14 is a flowchart illustrating the steps that are performed in assigning a viewer to a slot in the schedule.

When a cub decides to schedule a viewer into an empty slot that is owned by the cub, the steps shown in FIG. 14 are performed. Initially, the cub is ready to schedule a viewer into an unoccupied slot that it owns (step 120 in FIG. 14). The cub then generates a viewer state record for the first read operation (step 122 in FIG. 14). The cub immediately forwards the viewer state record to the first successor and second successor (step 124 in FIG. 14).

Figure 15:
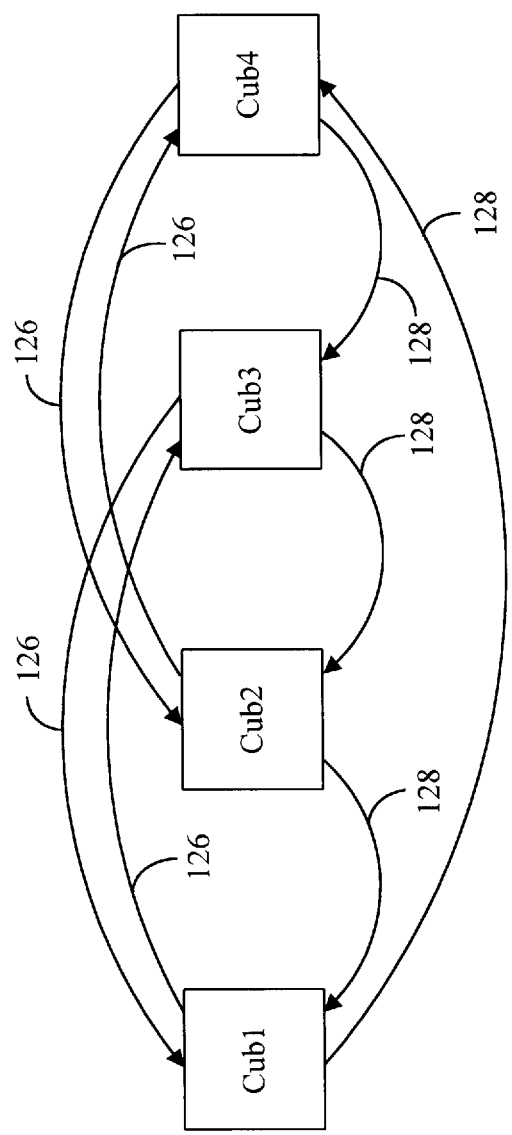
FIG. 15 is a block diagram illustrating the forwarding of viewer state records to second successors and the forwarding of deschedule messages to predecessors.

One possibility in such a scenario is that the assigning cub crashes between the time that it sends a viewer state record to its second successor and when it sends the viewer state record to its immediate successor. The preferred embodiment of the present invention provides a way to prevent the immediate successor from assigning a different viewer to the same stripe. In particular, each time that a cub receives a viewer state from another cub wherein the receiving cub is acting as the second successor (i.e., the variable playsequence has a value of 2), the receiving cub immediately forwards the viewer state record to its predecessor. FIG. 15 illustrates such forwarding to the predecessor. The forwarding to the predecessor is indicated by arrows 128, and the forwarding to the second successor is indicated by arrows 126.

Figure 16:
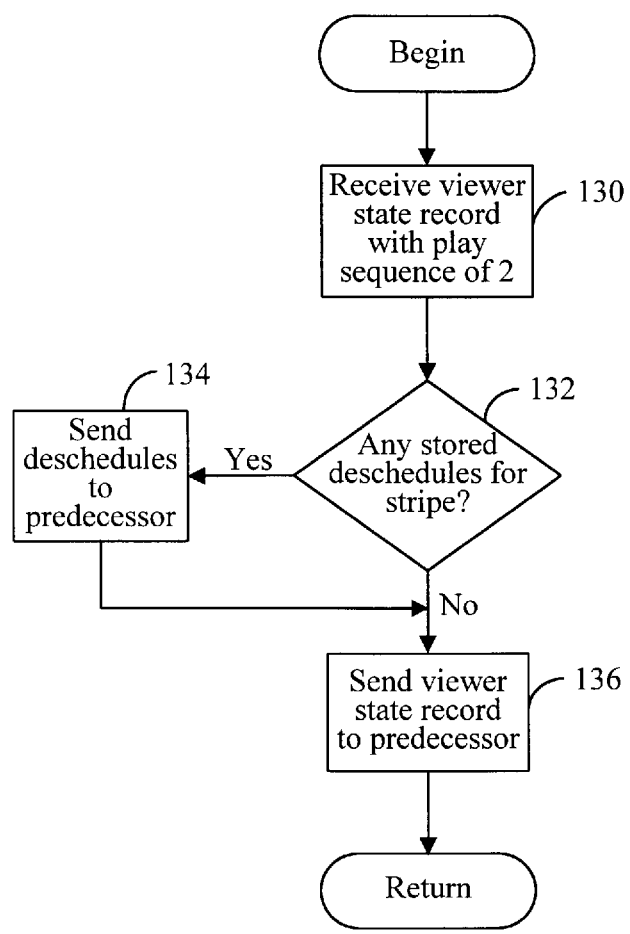
FIG. 16 is a flowchart illustrating the steps that are performed when a cub receives a viewer state record as a second successor.

The backwards sending of the viewer state records to predecessors presents another difficulty. In particular, the backwards sending presents a problem that a deschedule could be passed by a viewer state for the same stripe. FIG. 16 illustrates the steps that are performed to avoid this problem. In particular, when a viewer state record is received with a play sequence of 2 (step 130 in FIG. 16), the cub that determines whether any deschedules are stored in the hash table 64 for the same stripe as the stripe that is identified by the received viewer state record (step 132 in FIG. 16). If such deschedules are stored, the deschedules are sent to the predecessor (step 134) before the viewer state record is sent to the predecessor (step 136 in FIG. 16).

While the present invention has been described with reference to a preferred embodiment thereof, those skilled in the art will appreciate that various changes in form and detail may be made without departing from the intended scope of the invention as defined in the appended claims.

We claim:

1. A computer-readable storage medium for use in a distributed system having multiple data servers upon which data blocks of a data sequence are stored, said medium holding instructions for performing the computer-implemented steps of:

forwarding an object that encapsulates scheduling information for reading of the data blocks of the data sequence to each of the data servers that stores a data block of the data sequence;

wherein in response to receiving the object, each data server schedules reading of a selected one of the data blocks that it stores, said selected data block being identified by the scheduling information in the object; and sequentially reading the selected data blocks from consecutive ones of the data servers according to the scheduled reading to produce the data sequence for distribution.

2. The computer-readable storage medium of claim 1, further holding instructions for forwarding redundant copies of the object to each of the data servers that stores a data block of the data sequence to enhance fault tolerance.

3. The computer-readable storage medium of claim 1 wherein the scheduling information specifies a file that holds the data blocks of the data sequence.

4. The computer-readable storage medium of claim 3 wherein the scheduling information specifies what data block in the data file is to be read next.

5. The computer-readable storage medium of claim 1 wherein the medium also holds instructions, for each data server for updating the scheduling information encapsulated into the object to identify a next data block to be read after receiving the object.

6. The computer-readable storage medium of claim 1 wherein the data blocks hold multimedia data.

7. The computer-readable storage medium of claim 1 wherein the distributed system is a video-on-demand system.

8. The computer-readable storage medium of claim 1, wherein said object includes:

an indication of which selected block in the data sequences is to be output;

an indication of what file contains the selected block;

an indication of where the selected block is to be output; and an indication of when the selected block is to be output.

9. The computer-readable storage medium of claim 8 wherein the object also includes an indication of whether the block is a mirrored secondary block.

10. A computer-readable storage medium for use in a distributed system having storage devices upon which are stored data blocks of a data sequence and data servers for reading the data blocks from the storage devices, said medium holding instructions for performing the computer-implemented steps of:

in response to receiving a viewer state record at a first of the data servers that encapsulates scheduling information for a read operation of a selected data block of a data sequence, scheduling the read operation of the selected data block at the first of the data servers; and forwarding the viewer state record from the first data server to a second of the data servers that is responsible for reading a next data block of the data sequence after the selected data block and forwarding the viewer state record to a third of the data servers that is responsible for reading a data block after the next data block in the data sequence, for scheduling.

11. The computer-readable storage medium of claim 10, also holding instructions for ignoring a second viewer state record in response to receiving the second viewer state record at the first data server when a viewer state record like the second viewer state record has already been received at the first data server.

12. The computer-readable storage medium of claim 10, further holding instructions for performing the scheduled read operation of the selected data block at the first of the data servers.

13. A computer-readable storage medium for use in a distributed system having video data servers for storing sequences of video data, said medium holding instructions for performing a method of distributed scheduling, comprising the computer-implemented steps of:

receiving a scheduling data structure at a selected one of the video data servers, said scheduling data structure holding information about an operation on a file to be scheduled by the selected video data server;

in response to receiving the scheduling data structure, scheduling the operation on the file at the selected video data server; and updating the scheduling data structure and forwarding the scheduling data structure to a next of the video data servers that is to perform an operation on the file.

14. The computer-readable storage medium of claim 13 wherein the updating comprises specifying a next block of data to be read in a data sequence held in the file.

15. In a computer system having data servers with storage devices across which data blocks of data sequences are striped, said data servers being organized into a defined sequence, a method comprising the computer-implemented steps of:

dividing time into a repeating cycle of time slices for each data server, wherein a time slice is a sufficient amount of time to output a data block by one of the data servers and each data server has a like cycle of time slices such that each time slice has a position in the cycle and each cycle of a data server is offset in time relative to the cycle of its predecessor data server in the sequence of data servers;

designating aggregates of like positioned time slices in cycles of the data server as slots;

for a given slot, designating a time at which a selected one of the data servers owns the given slot such that only the selected data server is permitted to output a data block to a specified viewer at the time; and at the designated time at which the selected data server owns the given slot, scheduling outputting of an identified data sequence by assigning the specified viewer to the given slot by the selected data server such that during time slices that make up the given slot, data blocks of the identified data sequence are output from the data servers to the specified viewer.

16. The method of claim 15, further comprising the steps of:

for an additional slot, designating a second time at which an additional one of the data servers owns the additional slot such that only the additional data server is permitted to output a data block to a given viewer at that second time; and at the designated second time, scheduling outputting of a given data sequence by assigning the given viewer to the additional slot by the additional data server such that during time slices that make up the additional slot, data blocks of the given data sequence are output from the data servers to the given viewer.

17. In a distributed system having multiple data servers upon which data blocks of a data sequence are stored, a method of distributed scheduling of reading of the data blocks of the data sequence, comprising the computer-implemented steps of:

forwarding an object that encapsulates scheduling information for reading of the data blocks of the data sequence to each of the data servers that stores a data block of the sequence;

wherein in response to receiving the object, each data server schedules reading of a selected one of the data blocks that it stores as identified by the scheduling information in the object; and sequentially reading the selected data blocks from consecutive ones of the data servers according to the scheduled reading to produce the data sequence for distribution.

18. The method of claim 17 wherein the forwarding is performed by each data server after the data server receives the object.

19. The method of claim 17, further comprising the step of forwarding redundant copies of the object to at least one of the data servers that stores a block of the data sequence to enhance fault tolerance.

20. In a distributed system having video data servers for storing sequences of video data, a method of distributed scheduling comprising the computer-implemented steps of:

receiving a scheduling data structure at a selected one of the video data servers, said scheduling data structure holding information about an operation on a file to be scheduled by the selected data server;

in response to receiving the scheduling data structure, scheduling the operation on the file at the selected video data server; and updating the scheduling data structure and forwarding the scheduling data structure to a next of the video data servers that is to perform an operation on the file.

21. The method of claim 20 wherein the operation is a read operation for reading video data from the file.

22. The method of claim 20 wherein the distributed system is a video-on-demand system.

23. In a distributed system having storage devices upon which are stored data blocks of a data sequence and data servers for reading the data blocks from the storage devices, a method comprising the computer-implemented steps of:

passing a viewer state record that encapsulates scheduling information for a read operation of a selected data block of a data sequence to a first of the data servers;

in response to receiving the viewer state record, scheduling the read operation of the selected data block at the first of the data servers; and forwarding the viewer state record from the first data server to a second of the data servers that is responsible for reading a next data block of the data sequence after the selected data block and forwarding the viewer state record to a third of the data servers that is responsible for reading a data block after the next data block in the data sequence for scheduling.

24. A distributed system, comprising:

storage devices for storing data blocks of a data sequence;

multiple data servers for reading the data blocks from the storage devices, wherein each data server has at least one of the storage devices from which it may read data;

a distributed schedule distributed among the data servers so that each data server holds a portion of the schedule, the distributed schedule defining when the data servers read selected data blocks, information within the distributed schedule being contained in objects that can be passed among the data servers;

a connection mechanism for connecting the data servers so that the objects may be forwarded among the data servers to prompt the data servers to schedule the reading of the data blocks of the data sequence; and a network switch connected to the data servers to receive the data blocks read by the data servers, order the data blocks into the data sequence, and distribute the data sequence over a network.

25. In a computer system having video servers for providing video sequences to viewers in accordance with a schedule that is divisible into slots, a method comprising the computer-implemented steps of:

distributing among the video servers portions of the schedule so that individual video servers view different portions of the schedule but no one video server views the schedule in its entirety;

at a first of the video servers, applying an assignment protocol to determine a first slot in the schedule where a first of the viewers is to be scheduled to receive one of the video sequences and scheduling the first viewer in the first slot of the schedule; and at a second of the video servers, applying an assignment protocol to determine a second slot in the schedule where a second of the viewers is to be scheduled to receive another of the video sequences and scheduling the second viewer server in the second slot of the schedule.

26. A computer-readable storage medium for use in a computer system having video servers for providing video sequences to viewers in accordance with a schedule that is divisible into slots, said medium holding instructions for performing the steps of:

distributing among the video servers portions of the schedule so that individual video servers view different portions of the schedule but no one video server views the schedule in its entirety;

at a first of the video servers, applying an assignment protocol to determine a first slot in the schedule where a first of the viewers is to be scheduled to receive one of the video sequences and scheduling the first viewer in the first slot of the schedule; and at a second of the video servers, applying an assignment protocol to determine a second slot in the schedule where a second of the viewers is to be scheduled to receive another of the video sequences and scheduling the second viewer server in the second slot of the schedule.

27. In a computer system having multiple data servers in which a first data server holds a primary block of data and one or more other data servers hold secondary blocks of data that in aggregate form the primary block of data, a computer-readable storage medium holding instructions for performing a method comprising the steps of:

distributing among the video servers portions of the schedule so that individual video servers view different portions of the schedule but no one video server views the schedule in its entirety;

detecting failure of the first server to output the primary block of data when scheduled; and outputting the secondary blocks from the one or more other data servers in place of the primary block of data.

28. The computer-readable storage medium of claim 27, further holding instructions for performing the step of scheduling output of the secondary block of data held at the second server to the destination via the data funnel.

29. The computer-readable storage medium of claim 28, further holding instructions for performing the step of forwarding the mirror view state record to the third server.

30. In a distributed system having multiple data servers connected to distribute data sequences over a network, each data server supporting at least one storage device, wherein data files are distributed across the data servers and stored on each of the storage devices, a method comprising the following steps of:

distributing among the data servers a schedule for serving requested ones of the data sequences so that individual data servers view different portions of the schedule but no one data server views the schedule in its entirety; and reading selected data blocks from the storage devices at the data servers according the schedule portions viewed by the data servers.

31. The method of claim 30, further comprising the step of cycling the schedule portions among the data servers so that the data servers read the data blocks sequentially to produce the requested ones of the data sequences.

32. The method of claim 30, wherein the schedule is segmented into slots to which the data sequences are assigned for coordinating service of the data sequences, individual data servers having ownership of a current slot within their respective schedule portions.

33. The method of claim 30, further comprising the steps of:

receiving at a particular data server a request to insert a new data stream into the current slot in the schedule portion currently being viewed by the particular data server; and evaluating at the particular data server whether to insert the new data stream into the current slot.

34. The distributed system of claim 30, wherein the data servers pass objects that encapsulate scheduling information for reading the data blocks.

35. The distributed system of claim 30, wherein the data servers comprise video servers, and the distributed schedule schedules continuous distribution of the data blocks to form a streaming video sequence.

36. A distributed system, comprising:

multiple data servers, each data server supporting at least one storage device, wherein data files are distributed across the data servers so that data blocks of the data files are stored on each of the storage device;

a distributed schedule distributed among the multiple data servers so that each data server holds a portion of the schedule but no one data server holds all of the schedule, the distributed schedule defining when selected data blocks are read by corresponding ones of the data servers to serve a data sequence; and the data servers cycling the schedule portions among themselves to continue service of the data sequence.

* * * * *